(12) United States Patent
Reeves et al.

(10) Patent No.: US 9,398,424 B1
(45) Date of Patent: Jul. 19, 2016

(54) DELIVERING MESSAGES TO DESTINATION DEVICES

(75) Inventors: Raymond Emilio Reeves, Olathe, KS (US); Ryan Alan Wick, Punta Gorda, FL (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1661 days.

(21) Appl. No.: 12/347,707

(22) Filed: Dec. 31, 2008

(51) Int. Cl.
*H04L 12/28* (2006.01)
*H04W 4/06* (2009.01)
*H04W 4/14* (2009.01)

(52) U.S. Cl.
CPC .. *H04W 4/06* (2013.01); *H04W 4/14* (2013.01)

(58) Field of Classification Search
None
See application file for complete search history.

(56) References Cited

U.S. PATENT DOCUMENTS

| | | | |
|---|---|---|---|
| 6,289,223 B1* | 9/2001 | Mukherjee et al. | 455/466 |
| 7,684,811 B2* | 3/2010 | Beckmann | H04W 4/14 340/7.25 |
| 2003/0013466 A1* | 1/2003 | Ahn | 455/466 |
| 2005/0089006 A1* | 4/2005 | Wang et al. | 370/349 |
| 2008/0270558 A1* | 10/2008 | Ma | 709/206 |
| 2009/0013045 A1* | 1/2009 | Maes et al. | 709/205 |
| 2010/0029254 A1* | 2/2010 | Libonati et al. | 455/414.2 |
| 2010/0099421 A1* | 4/2010 | Patel et al. | 455/450 |

OTHER PUBLICATIONS

Interim European Telecommunication Standard; European digital cellular telecommunications system (phase 1); Technical realization of the short message service Cell broadcast; Feb. 1992; European Telecommunications Standards Institute; Valbonne Cedex, France; Reference: GSM 03.41; http://www.3gpp.org/ftp/Specs/html-info/0341.htm; (pp. 1-2 and 1-13 from 3.4.0).

* cited by examiner

*Primary Examiner* — Jae Y Lee
*Assistant Examiner* — Thinh Tran

(57) ABSTRACT

Systems, methods, and computer-readable media for delivering messages to destination devices are provided. In embodiments, a message is associated with a destination identifier that identifies a destination to deliver the message. The message might be communicated to one or more destination devices via various paths depending on the destination identifier. In one embodiment, a message associated with a device destination identifier is delivered to a destination device via a direct component while a message associated with a geographical or categorical destination identifier is delivered to a destination device via a broadcast component. Upon delivery to a destination device, in instances where the message is associated with a categorical destination identifier, the device might discern whether to present the message based on whether the message is of interest to the device or a user associated therewith. The message can be presented via a short-message-service-based user interface.

20 Claims, 6 Drawing Sheets

DELIVERING MESSAGES TO DESTINATION DEVICES

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a set of computer-useable instructions providing a method for delivering messages to destination devices is illustrated. The method includes receiving a message. The message includes an indication of a destination identifier. A destination identifier associated with the message is identified. The destination identifier identifies the destination to which the message is to be delivered. Based on the destination identifier, the message, or a variation thereof, is communicated to a direct component that communicates direct messages to destination devices or a broadcast component that communicates broadcast messages to destination devices.

In other embodiments, one or more computer-readable media having computer-useable instructions embodied thereon for performing a method for delivering messages to mobile devices is illustrated. The method includes receiving a broadcast message associated with a categorical identifier. The categorical identifier is used to determine whether the broadcast message is of interest to a destination device or a user associated therewith. Based on that determination, the broadcast message is displayed via a SMS-based user interface.

In still further embodiments, a system for delivering messages to destination devices is illustrated. The system includes a message component. The message component receives a message from a source device, the message being associated with a destination identifier that is a device identifier, a categorical identifier, or a geographical identifier. The message component communicates the message in accordance with the destination identifier. The system also includes a direct component. The direct component receives the message if the destination identifier is a device identifier. The direct component communicates the message to destination devices corresponding with the device identifier via cell towers. The system further includes a broadcast component. Such a broadcast component receives the message if the destination identifier comprises the categorical identifier or the geographical identifier and communicates the message to destination devices via cell towers.

BRIEF DESCRIPTION OF THE SEVERAL VIEWS OF THE DRAWING

Illustrative embodiments of the present invention are described in detail below with reference to the attached drawing figures, and wherein.

DETAILED DESCRIPTION

Figure 1:
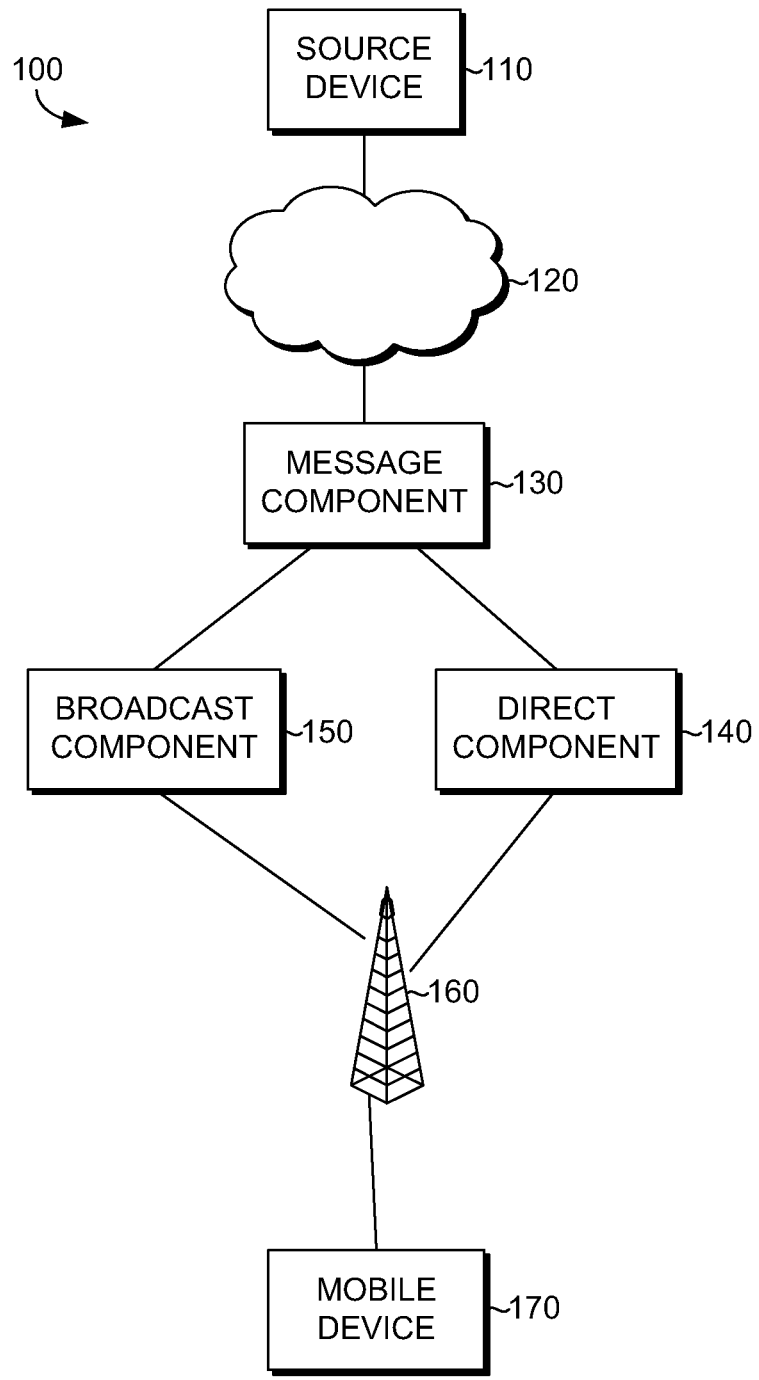
FIG. 1 is a block diagram of an exemplary system for delivering messages, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated embodiments. These acronyms and shorthand notations are solely intended for the purpose of providing an easy methodology of communicating the ideas expressed herein and are in no way meant to limit the scope of the present invention. The following is a list of these acronyms:

CD-ROM Compact Disk Read Only Memory
DVD Digital Versatile Discs
EEPROM Electrically Erasable Programmable Read Only Memory
IP Internet Protocol
LAN Local Area Network
MDN Mobile Directory Number
MO Mobile Originated
PC Personal Computer
PDA Personal Digital Assistant
RAM Random Access Memory
ROM Read Only Memory
SMS Short Message Service
WAN Wide Area Network Embodiments of the present invention may be embodied as, among other things, a method, system, or a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings generally, and initially to FIG. 1 in particular, an exemplary system 100 for delivering messages to devices is illustrated. A message, as used herein, refers to a message communicated from a source device to one or more destination devices, such as a mobile device. A message might be, for example, a direct message (i.e., SMS message), a broadcast message, or the like. A direct message refers to a message communicated from a source device to one or more specific destination devices. That is, a direct message is transmitted from point-to-point (i.e., one-to-one or one-to-multiple). In this regard, a direct message is associated with a known destination device. Accordingly, a direct message can be communicated to a destination device despite the geographical area in which the destination device is located. In embodiments, a direct message is communicated using Short Message Service (SMS). Direct messages can be communicated in association with a destination identifier (e.g., MDN) or destination code, as discussed more fully below, that uniquely identifies a particular destination device(s) to which the message should be communicated. A direct message might be a text message (i.e., texts or SMS) that includes text content and/or binary content. Accordingly, a direct message might include, for example, a personal message, advertising information, public information, a news alert, financial information, weather information, ring tones, logos, or the like.

A broadcast message refers to a message simultaneously delivered to destination devices. Broadcast messages are initially directed to one or more cell towers, rather than to specific destination devices. Broadcast messages are not initially associated with specific recipient information. Thus, a source device is able to send a message to multiple recipients without knowing specific recipient mobile device information. The capability to send messages without knowing specific mobile device information is convenient for mobile device users. Additionally, the ability to send such messages also provides a valuable advertising tool, since recipients may be targeted based on specific interests.

In embodiments, the cell towers transmit the broadcast message to destination devices connected with the cell tower. Stated differently, a broadcast message is transmitted from point-to-area (i.e., one-to-many geographically focused messaging). In this regard, a broadcast message can be broadcast to all devices within a designated geographical area. A broadcast message can be broadcast to destination devices corresponding with a single cell tower, multiple cell towers, an entire network or multiple networks. Accordingly, a broadcast message might be communicated to destination devices located within one or more specific areas. Alternatively, a broadcast message might be communicated to all destination devices, such as all destination devices associated with a network (e.g., a wireless telecommunications network) or a group of networks. In one embodiment, a broadcast message is communicated using Short Message Service (SMS). Broadcast messages can be communicated in association with a destination identifier or a destination code, as discussed more fully below, that uniquely identifies a particular geographical area or group of geographical areas to which the message should be communicated. As such, the specific devices (e.g., device identifier) to which the message is to be broadcast can be unknown at the time the message is communicated from the source device. A broadcast message might be a text message (i.e., texts or SMS) that includes text content and/or binary content. Accordingly, a broadcast message might include, for example, a message, advertising information, public information, a news alert, financial information, weather information, ring tones, logos, or the like.

As shown in FIG. 1, an exemplary system 100 includes a source device 110, a message component 130, a direct component 140, a broadcast component 150, and a destination device 170. The source device 110 generates and/or communicates a message. The source device 110 of FIG. 1 can be any computing device that is capable of communicating a message, such as a direct message or a broadcast message. As such, the source device 110 may take on a variety of forms, such as a personal computer (PC), a laptop computer, a mobile phone, a personal digital assistant (PDA), a server, or any other device that is capable of communicating a message. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like. Messages that are sent from a mobile source device that uses wireless telecommunications are said to be mobile originated (MO) and are generally identified by a mobile directory number (MDN). Messages sent from a server source device or other computing device, on the other hand, are typically identified by an internet protocol (IP) address.

The source device 110 communicates messages by way of a network, depicted generally by the numeral 120. Network 120 could be wired, wireless, or both. Network 120 can include multiple networks, as well as being a network of networks, but is shown in more simple form so as to not obscure other aspects of the present invention. For example, network 120 may include one or more wide area networks (WANs), one or more local area networks (LANs), one or more public networks, such as the Internet, and/or one or more private networks. In one embodiment, network 120 includes at least a portion of a wireless telecommunications network. Network 120 might include an array of devices, which are not shown so as to not obscure more relevant aspects of the invention. In a wireless telecommunications network, components such as a base station, a communications tower, or even access points (as well as other components) can provide wireless connectivity in some embodiments. Although single components are illustrated for clarity, one skilled in the art will appreciate that network 120 can enable communication between multiple source devices, message components, direct components, broadcast components, and/or destination devices.

In embodiments, a message communicated from the source device 110 might include, or be associated with, an indication of the source (e.g., a source identifier such as an MDN or IP address), an indication of the destination (e.g., a destination identifier(s) or a destination code(s)), or any other information that might be used to communicated the message, identify the source device or destination device, or the like. A destination identifier refers to any identifier that identifies a destination to which a message is to be delivered. A destination identifier might be, for example, a device identifier, a categorical identifier, a geographical identifier, a combination thereof, or the like. A device identifier refers to an identifier that describes or identifies a specific device to which a message is to be delivered. A device identifier might include numerals, text, symbols, or any other characters that indicate a device. In one embodiment, a device identifier refers to an MDN, an IP address, or the like. As a device identifier identifies a specific device to which a message is to be communicated, direct messages might be associated with device identifiers.

A categorical identifier refers to any identifier that describes or identifies a category that applies to or is associated with a destination device, or a user associated therewith. A categorical identifier might include numerals, text, symbols, or any other character that indicate a category. By way of example only, a category might refer to an interest, attribute, demographic, or preference of a user device or user associated therewith (e.g., sports, foods, restaurants, hobbies, arts, music, news, financial information, portions or preferences thereof, or the like). Accordingly, a categorical identifier might be directed towards destination devices associated with users that enjoy coffee.

A geographical identifier refers to any identifier that describes or identifies a geographical area with which a destination device, or user associated therewith, is associated. A geographical identifier might include numerals, text, symbols, or any other character that indicate a geographical area. By way of example only, a geographical identifier might identify an area or location to which a message is to be communicated. For instance, a geographical identifier might indicate a zip code, a street, a city, a state, a county, a country, or the like.

A destination code refers to any code (e.g., numerical, text, symbols, or the like) that represents one or more destination identifiers, such as device identifiers, categorical identifiers, geographical identifiers, or the like. In embodiments, a destination code does not include specific recipient information. Rather, if a message includes a destination code, the destination code is recognized and mapped to one or more corresponding destination identifiers. A destination code might be recognized based on a code indicator that provides an indication of a destination code. Such a code indicator might be, for example, a numerical, text, or symbol indicator that precedes or follows the code. A destination code might be an individualized code or a global code. An individualized code refers to a code that is unique to a source device or user associated therewith. That is, each source device might have a set of codes that are applicable to the particular source device. For example, a destination code of "Friends" for one source device might represent different destination devices (e.g., destination device 1 and destination device 2) than a destination code of "Friends" for another source device (e.g., destination device 3 and destination device 4). A global code refers to a code that is shared among multiple source devices. That is, multiple source devices, including all devices, might use the same code to represent the same destination devices.

By way of example only, a destination code might represent a device identifier. For instance, a message including the destination code "Recipient" may be a message to be communicated to a group of destination devices identified by MDNs. In such a case, the destination code "Recipient" can be mapped to the corresponding MDNs. A destination code might represent a geographical identifier. For instance, a message including the destination code "*001*" may be a message to be communicated to destination devices located within area code "66666." Accordingly, the destination code *001* can be mapped to the corresponding area code "66666." A destination code might represent a categorical identifier. In this regard, a message including the destination code "#555" might be a message to be communicated to destination devices associated with a user interested in sports. In such a case, the destination code "#555" can be mapped to the categorical identifier. One skilled in the art will appreciate that a destination code may represent and/or map to multiple destination identifiers. For example, assume that a message includes a destination code of "Sports Fans in City." The code portion "City" is mapped to the appropriate geographical identifier, and the code portion "Sports Fan" is mapped to the appropriate categorical identifier.

The message component 130 receives messages communicated from the source device 110. The message component 130 can be any computing device including, for example, a gateway. The message component 130 might identify or recognize an indication of a destination. An indication of a destination may be provided via a message or in association therewith, for example, in the form of a destination code or a destination identifier. Accordingly, the message component 130 might identify or recognize a destination code or a destination identifier, or a type thereof (e.g., device identifier, geographical identifier, or a categorical identifier). In instances in which an indication of a destination is provided by way of a destination code, the message component 130 can map or associate the destination code to one or more corresponding destination identifiers. One skilled in the art will appreciate that any lookup system or algorithm can be utilized to map the destination code to corresponding destination identifiers. Upon recognizing or identifying one or more destination identifiers associated with a destination code, the message, or a portion thereof, might be modified to include the destination identifier such that a subsequent component (e.g., a direct component and/or a broadcast component) does not need to perform such a correlation.

Based on a destination identifier, or type thereof, associated with a message, the message, or a new or modified version thereof, is communicated to the direct component 140, the broadcast component 150, or a combination thereof. In embodiments, messages associated with a direct destination identifier, such as a MDN, are communicated to the direct component 140. By way of example only, a message including a direct destination identifier or a destination code that corresponds with a direct destination identifier is transmitted to the direct component 140. Such messages are oftentimes referred to as point-to-point messages and are widely distributed among mobile users today. To send a point-to-point message, generally, the source device directs the message to a destination device where a device identifier (e.g., MDN) of the destination device is known. Conversely, in embodiments, messages associated with a categorical identifier or a geographical identifier are communicated to the broadcast component 150. For instance, a message including a categorical destination identifier or a destination code that corresponds with a categorical destination identifier is transmitted to the broadcast component 150. The broadcast component 150 allows for transmission of messages without knowing specific destination device information. Thus, messages that are not associated with device identifiers (e.g., categorical identifiers and/or geographical identifiers) can be communicated to the broadcast component 150.

One skilled in the art will appreciate that a message might be associated with multiple destination identifiers. In a case where multiple destination identifiers associated with a message include a combination of device identifiers and categorical or geographical identifiers, the message component 130 can be configured to transmit the message, or a copy or a modified version thereof, to both the direct component 140 and the broadcast component 150. Although the message component 130 is illustrated as a separate component in FIG. 1, the message component 130 might, in embodiments, be integrated with the source device 110, the direct component 140, the broadcast component 150, or another component. By way of example only, the message component 130 might be integrated with the direct component 140. In such a case, the direct component might receive a message and recognize a destination identifier associated therewith. If the destination identifier comprises a direct identifier, the direct component might process the message, whereas if the destination identifier comprises a categorical or geographical identifier, the direct component might transmit the message to the broadcast component 150.

The direct component 140 receives messages from the message component 130. In embodiments, the direct component 140 receives direct messages (i.e., point-to-point messages), for example, associated with a device identifier (e.g., expressly or via a destination code). The direct component 140 might recognize or identify one or more destination identifiers, such as device identifiers, associated with the message. The direct component 140 communicates received messages to destination devices, such as the destination device 170. Messages can be communicated via a cell tower 160. The direct component 140 might communicate a message to specific destination devices based on an indication of a destination (e.g., a destination identifier and/or a destination code) provided within or in association with the message.

The broadcast component 150 receives messages from the message component 130. In embodiments, the broadcast component 150 receives broadcast messages (e.g., point-to-area), for example, associated with a categorical identifier or a geographical identifier (e.g., expressly or via a destination code). The broadcast component 150 might recognize or identify one or more destination identifiers, such as categorical or geographical identifiers, associated with the message. The broadcast component 150 communicates received messages to destination devices, such as the destination device 170. Messages can be communicated via the cell tower 160. The broadcast component 150 might communicate a message to destination devices based on an indication of a destination (e.g., a destination identifier and/or a destination code) provided within or in association with the message.

By way of example only, in instances where a message in association with a categorical identifier is received, the message might be communicated to all destination devices, such as all destination devices associated with one or more wireless telecommunications networks. In this regard, a message is transmitted to all cell towers (e.g., associated with a wireless telecommunications network) such that the message is transmitted to all destination devices. In instances where a message in association with a geographical identifier is received, the message might be communicated to appropriate destination devices via appropriate cell towers. In such a case, the broadcast component 150 can identify or recognize appropriate cell towers to which the message is to be directed. Accordingly, a broadcast component, or another component, can be configured to map or correlate a geographical area (e.g., identified by city, state, country, county, zip code, street, etc) to a set of one or more cell towers. For example, assume that a message in association with a geographical identifier that identifies a zip code "66666" is received by the broadcast component 150. The broadcast component 150 can determine one or more cell towers that correspond with the zip code "66666," and thereafter communicate the message, or a modified or new message, to the corresponding cell towers.

The cell tower 160 is utilized to communicate messages to destination devices, such as the destination device 170. The cell tower 160 might receive a message from the direct component 140 or the broadcast component 150 and transmit the message to the appropriate destination device. By way of example only, where a cell tower receives a message in association with one or more device identifiers, the cell tower transmits the message to the corresponding destination devices. Where a cell tower receives a message in association with a geographical identifier, the cell tower might transmit the message to the destination devices that correspond with the geographical identifier, for example, as identified by the broadcast component, or alternatively, the cell tower transmits the message to all destination devices that correspond with the cell tower. Where a cell tower receives a message in association with a categorical identifier, the cell tower may transmit the message to all destination devices associated with the cell tower.

The destination device 170 receives messages. Such messages might originate from the source device 110 and be communicated via the message component 130, the direct component 140, the broadcast component 150, the cell tower 160, or a combination thereof. In one embodiment, the destination device 170 automatically presents the received message, or an indication thereof (e.g., an alert notification), to a user upon receipt of the message. For example, in instances where the received message is associated with a device identifier or a geographical identifier, the destination device 170 might present the message, or an indication thereof, upon receipt of the message. An alert notification may be, for example, an alarm, a tone or series of tones, a light, a vibration, text, or the like.

In alternative embodiment, the destination device 170 automatically presents the message, or an indication thereof, upon receiving the message and determining that the message pertains to the destination device or a user of the destination device. In such a case, the destination device 170 might be configured to recognize, identify, or determine whether the message pertains to the destination device or a user associated therewith. Accordingly, the destination device might recognize whether a destination identifier or destination code in association with a message matches or corresponds with a preference tag or other identifier associated with the user or destination device. A preference tag, as used herein, refers to an indication of an interest, an attribute, a demographic, or a preference of a user or user device. Preference tags might be recognized automatically. For instance, preference tags might be identified and stored as a user searches for data (e.g., within an application or the World Wide Web) via the destination device. Alternatively, preference tags might be recognized upon receiving user input indicating the preference tags. Such preference tags might be stored, for example, within the destination device.

In embodiments, a destination device can present messages using a SMS-based user interface. That is, a destination device might present a broadcast message in the same manner as a direct message utilizing a SMS-based user interface. In such a case, upon receiving a broadcast message, the message might be configured to be presented via a SMS-based user interface. It is contemplated to be within the scope of embodiments hereof that presenting messages may include an audible presentation, a visual presentation, or a combination of an audible and a visual presentation. The presentation of a message may be altered depending on a destination identifier associated with the message. For example, a message associated with the categorical identifier "Sports Fans" may be recognized and associated with a corresponding application or viewer. In the present example, a sports application or viewer might be associated with the "Sports Fan" categorical identifier.

Those skilled in the art will appreciate that the present invention contemplates the presence of additional components and/or subcomponents of the system 100, and the components and/or subcomponents may be combined with one another and/or separated into new components and subcomponents. By way of illustration, and not limitation, the system 100 could be embodied without a separate message component 130. In such a case, the direct component 140, the broadcast component 150, or both may be configured to perform the capabilities of the message component 130. Additionally, also by way of illustration and not limitation, the message component 130 might be configured to receive only messages not associated with device identifiers. In this regard, messages associated with device identifiers are communicated from the source device to the direct component 140.

Figure 2A:
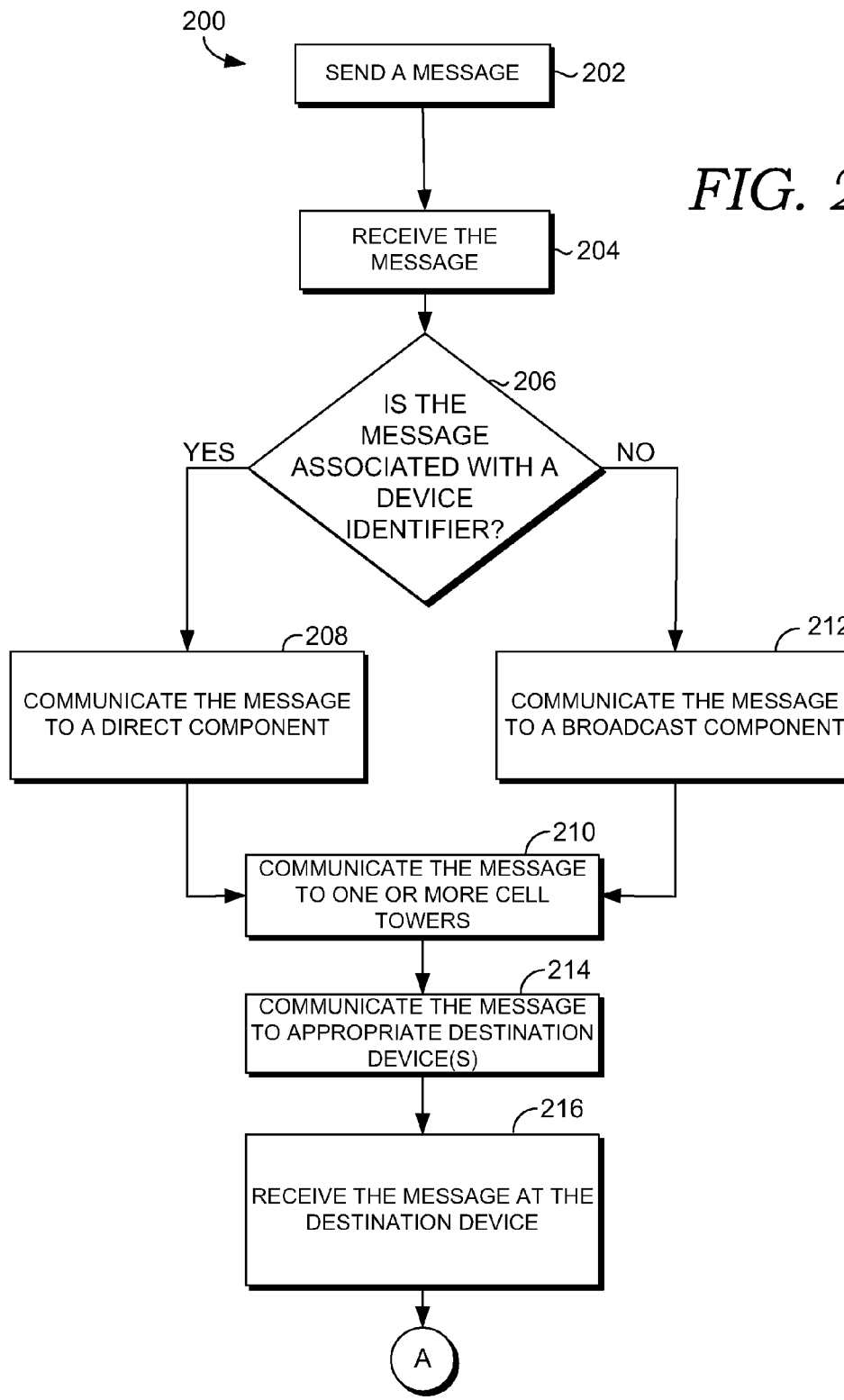
FIG. 2A is a flow diagram illustrating a first exemplary method for delivering messages to destination devices, in accordance with an embodiment of the present invention.
Figure 2B:
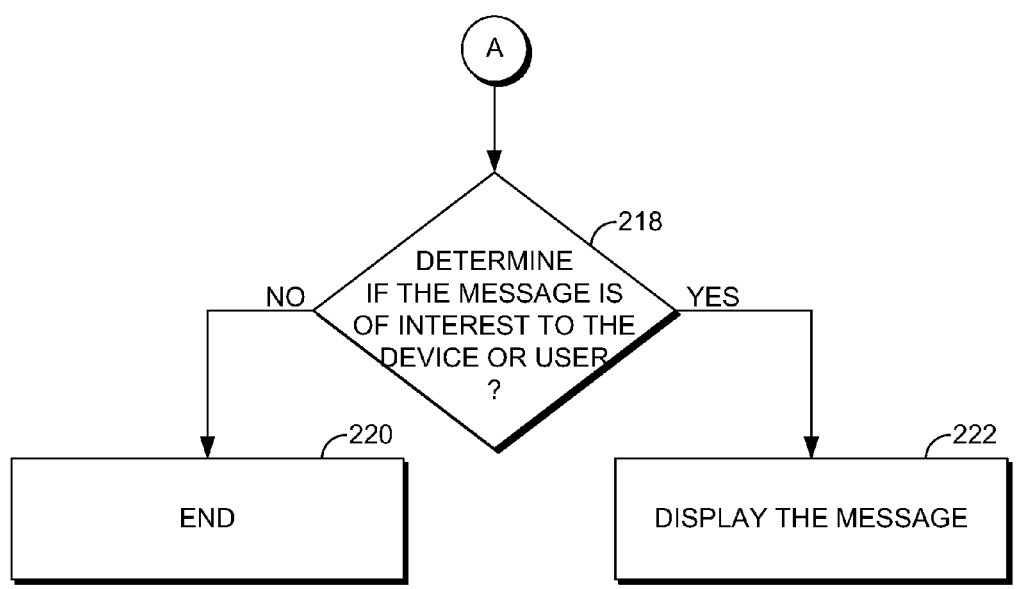
FIG. 2B, a continuation of FIG. 2A, is a flow diagram illustrating a first exemplary method for delivering messages to destination devices, in accordance with an embodiment of the present invention.

An exemplary method 200 for delivering messages to destination devices is illustrated in FIGS. 2A and 2B. Initially, as indicated at block 202, a message is sent from a source device via a network. The message includes or is associated with an indication of a destination. In embodiments, the indication of the destination includes a destination identifier or a destination code. The message is received by a message component at block 204. As previously illustrated, one will appreciate that a variety of components within the system 100 may receive messages.

Once the message is received, it is determined whether the message is associated with a device identifier. This is indicated at block 206. A device identifier provides an indication of a specific destination device to which the message is to be delivered. In cases where a message includes or is initially associated with a destination code, the destination code might be mapped to one or more destination identifiers to determine whether the message is associated with a device identifier.

If it is determined that the message is associated with a device identifier, the message, or a variation thereof, is communicated to a direct component at block 208. Subsequently, at block 210, the message, or a variation thereof, is communicated to one or more cell towers associated with the one or more destination devices to which the message is to be communicated. Such cell towers might be identified based on the device identifier. If, however, it is determined that the message is not associated with a device identifier, the message, or a variation thereof, is communicated to a broadcast component at block 212. That is, messages associated with a categorical identifier or a geographical identifier are communicated to the broadcast component. Subsequently, at block 210, the message, or a variation thereof, is communicated to one or more cell towers associated with the one or more destination devices to which the message is to be communicated. Such cell towers might be identified based on the geographical or categorical identifier. For example, in instances where the message is associated with a categorical identifier, the message might be transmitted to all cell towers, such as all cell towers associated with a wireless telecommunications network. In instances where the message is associated with a geographical identifier, the message might be transmitted to the cell towers that correspond with the geographical identifier. By way of example only, a message in association with zip code of "11111" can be communicated to cell towers identified as providing service to zip code "11111."

The cell tower(s) communicates the message to the appropriate destination device(s). This is indicated at block 214. In an embodiment where the message is associated with a device identifier, the cell tower(s) might communicate the message to the destination device corresponding with the device identifier. In an embodiment where the message is associated with a categorical identifier or a geographical identifier, the cell tower(s) might communicate the message to all destination devices within the service area of the cell tower. As such, the message might be transmitted to all destination devices connected to or corresponding with the cell tower.

At block 216, the destination device receives the message. Subsequently, at block 218, it is determined if the message is of interest or applicable to the destination device or user associated therewith. Messages that are of interest to users include a categorical identifier, or a portion thereof, that matches or corresponds with a preference tag, for example, stored on the destination device. For instance, assume a message is sent to "coffee lovers in zip code 11111." All destination devices within the zip code "11111" receive the message. If a destination device has a stored preference tag that corresponds with the categorical identifier, or a portion thereof, the message is of interest or applicable to the destination device or user associated therewith.

If it is determined that the message is not of interest or applicable to the destination device or user associated therewith, at block 220, the method ends. Accordingly, the message, or an indication thereof, is not presented to the user via the destination device. If, on the other hand, it is determined that the message is of interest or applicable to the destination device or user associated therewith, at block 222, the message is presented by way of the destination device. In embodiments, the message is configured to be presented via a SMS-based user interface. The SMS-based user interface presents a broadcast message in the same manner in which the destination device presents a direct (e.g., point-to-point) message. In embodiments, when a destination device receives a message, the destination device generates a notification. A SMS-based user interface mechanism in a destination device can generate the same notification for a direct message and broadcast message. This allows a user to receive multiple types of messages, such as direct (e.g., point-to-point) messages and broadcast messages, for example, utilizing the same interface. As such, the destination device presents the message via the SMS-based user interface, and the message is presented to the user in the same manner for both direct messages and broadcast messages. One skilled in the art will appreciate that the SMS-based user interface can be based on user preferences and might be configured to allow for distinguishing notifications for broadcast messages if the user desires.

Figure 3:
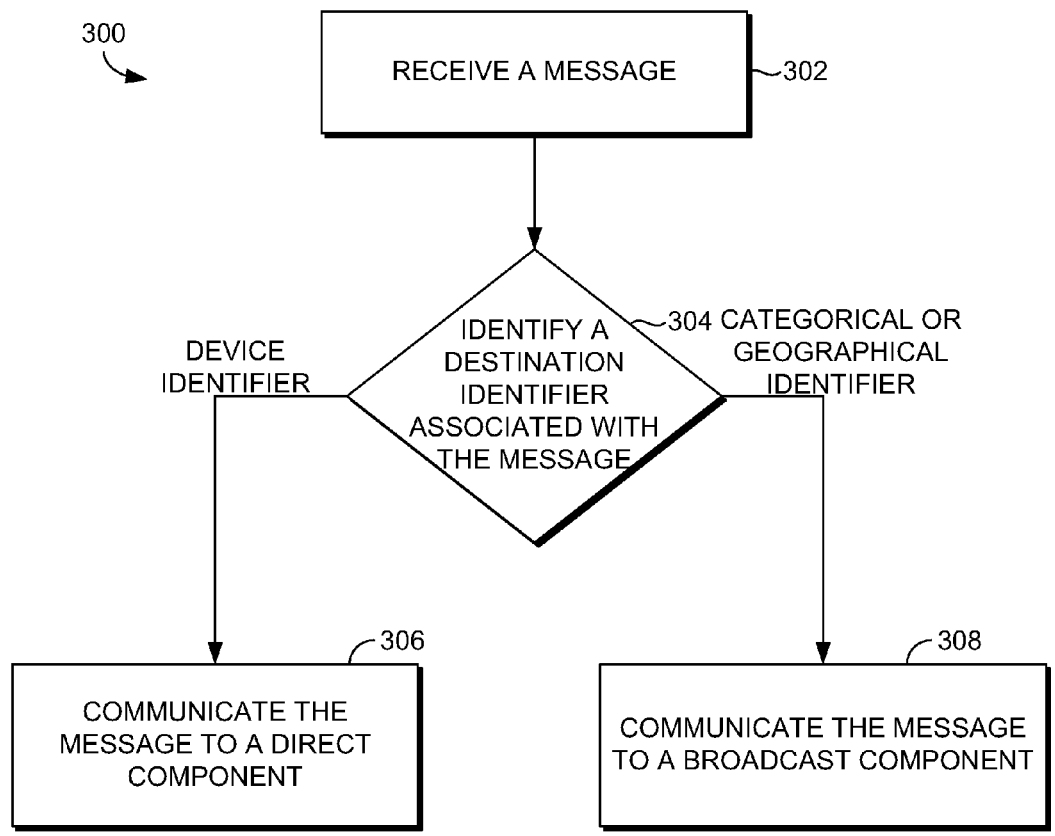
FIG. 3 is a flow diagram illustrating a second exemplary method for delivering messages to destination devices, in accordance with an embodiment of the present invention.

A second exemplary method 300 for delivering messages to a destination device is illustrated in FIG. 3. A message is received at block 302. In embodiments, the message includes an indication of a destination, such as a destination code or a destination identifier. Subsequently, at block 304, a destination identifier associated with the message is identified. In an embodiment, where the indication of the destination comprises a destination code, the destination code might be mapped to one or more corresponding destination identifiers. The destination identifier may be identified as a geographical identifier, a device identifier, or a categorical identifier.

If the destination identifier is identified as a device identifier, the message associated with such a device identifier is communicated to a direct component at block 306. If, on the other hand, the destination identifier is identified as a categorical identifier or a geographical identifier, the message associated with such a categorical and/or geographical identifier is communicated to a broadcast component at block 308.

One skilled in the art will appreciate that a message may be communicated to both the direct component and the broadcast component. By way of example, and not limitation, assume that a received message includes a device identifier, such as a MDN, and a geographical identifier, such as "City." The message is communicated to a direct component since it is associated with a device identifier, e.g. a MDN. The message is also communicated to a broadcast component as it is associated with a geographical identifier.

Figure 4:
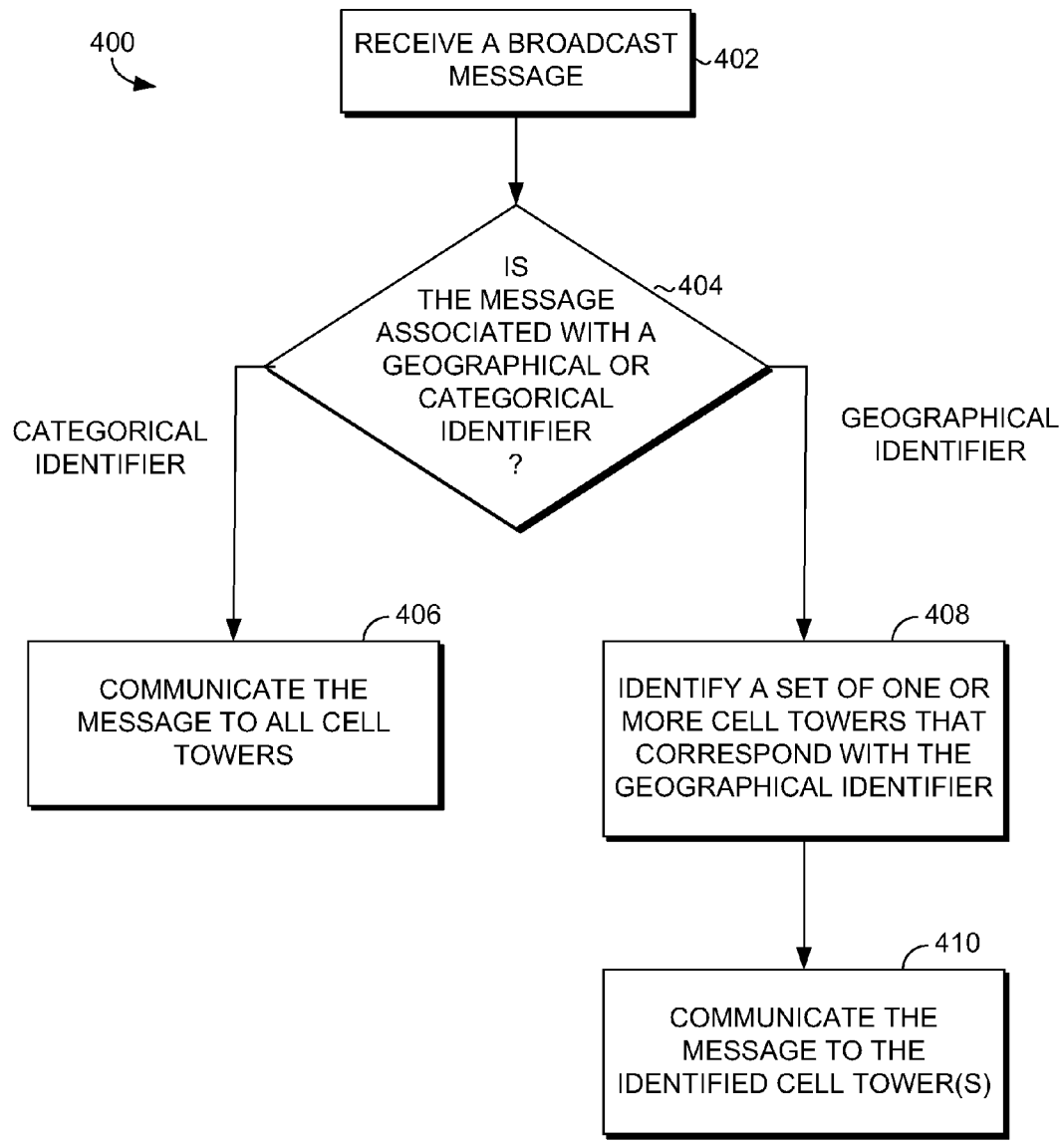
FIG. 4 is a flow diagram illustrating a third exemplary method for delivering messages to destination devices, in accordance with an embodiment of the present invention.

A third exemplary method 400 for delivering messages to destination devices is illustrated in FIG. 4. A broadcast message, including an indication of a destination, is received at block 402. The indication of a destination may be a destination identifier or a destination code. At block 404, it is determined if the broadcast message is associated with a geographical identifier or a categorical identifier. If it is determined that the broadcast message is associated with a categorical identifier, the message is communicated to all cell towers associated with a network (e.g., a wireless telecommunications network). This is indicated at block 406. If, however, it is determined that the broadcast message is associated with a geographical identifier, a set of one or more cell towers that correspond with the geographical identifier are identified at block 408. Subsequently, at block 410, the message is communicated to identified cell tower(s) such that the message can be communicated to destination devices connected to or in association with the cell tower(s).

Figure 5:
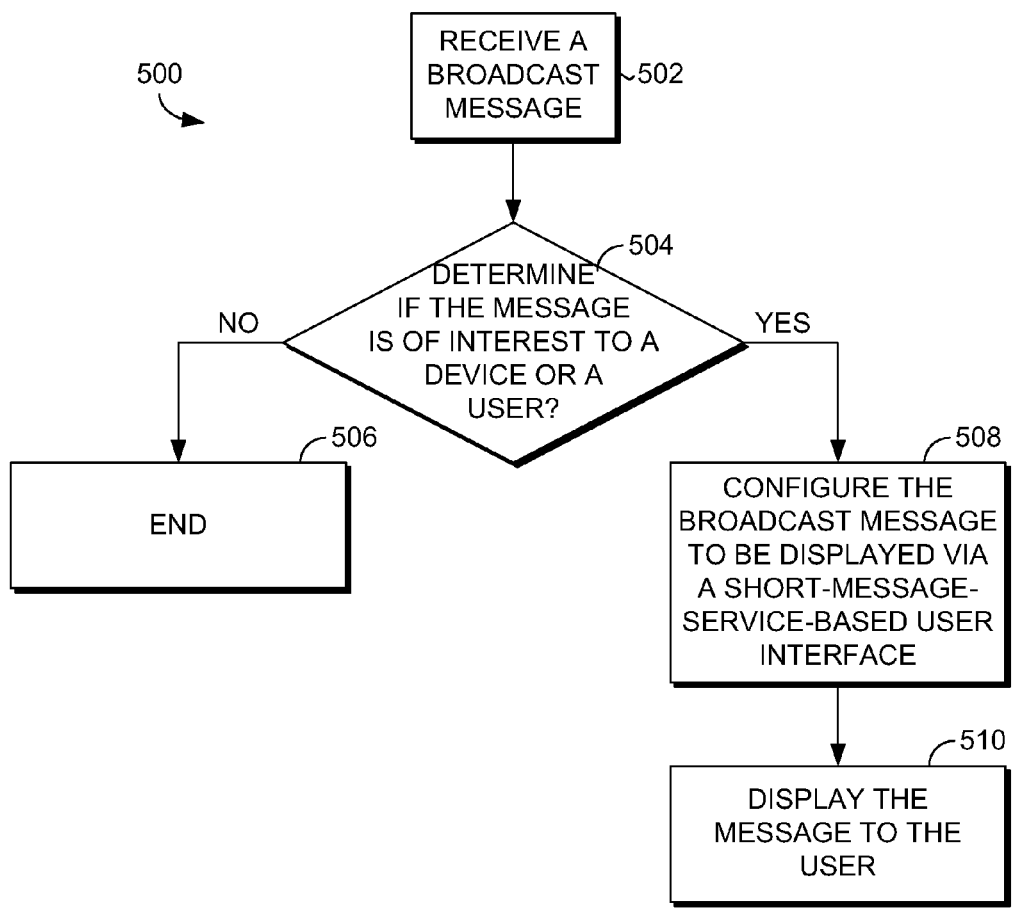
FIG. 5 is a flow diagram illustrating an exemplary method for displaying messages via destination devices, in accordance with an embodiment of the present invention.

An exemplary method 500 for presenting messages on destination devices is illustrated in FIG. 5. A broadcast message is received at block 502. Destination devices might receive all broadcast messages associated with a geographical identifier if the destination device is within a geographic area corresponding with the geographical identifier. Destination devices might also receive all broadcast messages transmitted from a cell tower that are associated with a categorical identifier. At block 504, it is determined if the message is of interest or pertains to the destination device or a user associated therewith. The ability to discern which messages are of interest to the user can provide a valuable message filter. Otherwise, destination devices might display all broadcast messages received, and users would likely become inundated with messages.

To determine if the message is of interest to the user or destination device, a categorical identifier associated with the broadcast message can be used and compared to preference tags, for example, stored within the destination device. If a categorical identifier associated with the broadcast message, or a portion thereof, corresponds with or matches a preference tag, or a portion thereof, it can be determined that the message is of interest to the user or destination device. For example, assume that a message is sent to "runners." If the categorical identifier associated with the message "runners" matches or corresponds with a preference tag stored within the destination device, it is determined that the message is of interest to the user or destination device.

The destination device can include a mechanism to manage the preference tags stored within the destination device. The mechanism managing the tags may be updated by a user editing their preference tags. The preference tags may be managed directly on the destination device. Additionally, the service provider may provide corresponding online tag management.

If it is determined that the message is not of interest to the user, the method ends at block 506. Accordingly, the message is not presented via the destination device. If, on the other hand, it is determined that the message is of interest to the user, the message is configured to be presented via a SMS-based user interface at block 508. Thereafter, the message is presented using the SMS-based user interface of the destination device at block 510.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-useable instructions embodied thereon for performing a method for delivering messages to destination devices, the method comprising:
   receiving, at a messaging component, a message comprising an indication of a destination identifier, where the messaging component directly communicates messages to a direct component and a broadcast component based on the destination identifier of the message;
   identifying the destination identifier associated with the message, wherein the destination identifier identifies the destination to which the message is to be directly delivered to a component; and
   based on the destination identifier, directly communicating from the messaging component, the message, or a variation thereof,
   the broadcast component that communicates messages as broadcast messages to a set of destination devices such that a broadcast message is presented on a destination device of the set of destination devices as a direct message via a short-message-service-based interface based on a preference tag indicates a preference of broadcast messages to be displayed on the destination device;
   wherein presenting the broadcast message via the short-message-service-based interface comprises:
   receiving the message at the destination device;
   determining that the message, received as a broadcast message, is received from the broadcast component;
   determining that the destination identifier associated with the message matches the preference tag stored in association with the destination device; and
   presenting the message, received as a broadcast message, via an SMS-based message based on the preference tag.

2. The media of claim 1, wherein the message is received from a source device.

3. The media of claim 1, wherein the indication of a destination comprises a destination code or a destination identifier.

4. The media of claim 3, wherein the destination code is mapped to a destination identifier.

5. The media of claim 3, wherein the destination code is identified by a code indicator that provides an indication of a destination code.

6. The media of claim 1, wherein the destination identifier comprises the device identifier when the message is intended for a direct component, a categorical identifier, or a geographical identifier when the message is intended for the broadcast component.

7. The media of claim 6, wherein the message is communicated to the broadcast component upon identifying the geographical identifier or the categorical identifier.

8. The media of claim 7, wherein without the broadcast component receiving corresponding device identifiers for each destination device of the second set of destination devices, the broadcast component communicates the broadcast messages based on an association of the second set of devices with a cell tower.

9. The media of claim 7, wherein without the broadcast component receiving the corresponding device identifiers for each of the second set of destination devices, the broadcast messages are communicated as broadcast messages and presented as point-to-point direct messages on the short-message-service-based user interface based on a determination at each of the second set of destination devices to present the broadcast messages as point-to-point direct messages.

10. The media of claim 1, wherein when a determination is made that the preference tag does not match the destination identifier associated with the message, the message is not presented via the corresponding destination device SMS-based interface.

11. The media of claim 1, the device identifier is a mobile device number (MDN).

12. One or more non-transitory computer-readable media having computer-useable instructions embodied thereon for performing a method for delivering messages to destination devices, the method comprising:
    receiving a broadcast message associated with a categorical identifier;
    using the categorical identifier to determine whether the broadcast message is of interest to a destination device or a user associated therewith;
    based on a determination that the categorical identifier is of interest to the destination device or user, presenting the broadcast message from a broadcast component via a short-message-service-based user interface, and
    based on a determination that the categorical identifier is not of interest to the destination device, the broadcast message is not presented via the short-message-serviced-based interface.

13. The media of claim 12, wherein the broadcast message is communicated to a set of destination devices for presentation based on the broadcast message having the categorical identifier.

14. The media of claim 12, wherein the broadcast message is of interest to the destination device or the user associated therewith upon a determination that the categorical identifier corresponds to at least one preference tag stored on the destination device.

15. The media of claim 12, wherein the destination device receives the message from the broadcast component without the broadcast component receiving a device identifier for the destination device.

16. The media of claim 12, wherein based on the categorical identifier the presentation of the broadcast message is altered, wherein altering the presentation of the broadcast message is based on a specific application or viewer associated with the categorical identifier.

17. A system for delivering messages to destination devices, the system comprising:
    a message component that receives a message from a source device, wherein the message is associated with a destination identifier that comprises a device identifier, a categorical identifier, or a geographical identifier and communicates the message in accordance with the destination identifier;
    a direct component that receives the message associated with the destination identifier directly from the message component if the destination identifier comprises the device identifier and communicates the message to a first one or more destination devices corresponding with the device identifier via a first one or more cell towers;
    a broadcast component that receives the message associated with the destination identifier directly from the message component if the destination identifier comprises the categorical identifier or the geographical identifier and communicates the message to a second one or more destination devices via a second one or more cell towers without corresponding device identifiers for the one or more destination devices, and
    a destination device that receives the message associated with the destination identifier such that a broadcast message is presented on the destination device of the set of destination devices via a short-message-service-based interface based on a preference tag indicates a preference of broadcast messages to be displayed on the destination device; wherein presenting the broadcast message via the short-message-service-based interface comprises:
    receiving the message at the destination device;
    determining that the message, received as a broadcast message, is received from the broadcast component;
    determining that the destination identifier associated with the message matches the preference tag stored in association with the destination device; and
    presenting the message, received as a broadcast message, as a direct message based on the preference tag.

18. The system of claim 17, wherein the second one or more cell towers are selected in accordance with the categorical identifier or the geographical identifier.

19. The system of claim 17, wherein the second one or more cell towers correspond with the destination identifier.

20. The system of claim 17, wherein based on the categorical identifier the presentation of the broadcast message is altered, wherein altering the presentation of the broadcast message is based on a specific application or viewer associated with the categorical identifier.

* * * * *